Figure 1:
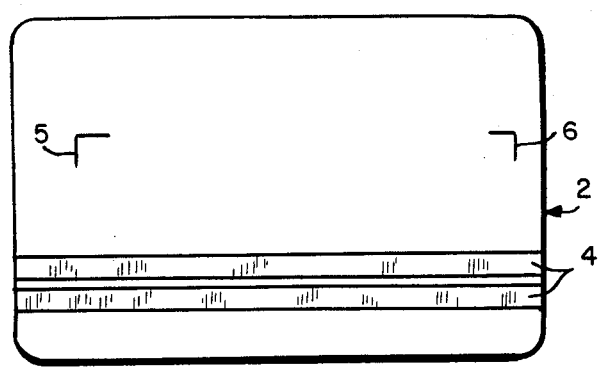

United States Patent

Stockburger et al.

[11] Patent Number: 4,620,727
[45] Date of Patent: Nov. 4, 1986

[54] CREDIT CARD

[76] Inventors: Hermann Stockburger, Kirnachweg 7, D-7742 St. Georgen; Hans-Georg Winderlich, Niedere Strasse 36, D-7730 VS-Villingen, both of Fed. Rep. of Germany

[21] Appl. No.: 738,493

[22] Filed: May 28, 1985

Related U.S. Application Data

[63] Continuation of Ser. No. 479,067, Mar. 16, 1983, abandoned.

[30] Foreign Application Priority Data

Jul. 24, 1981 [DE] Fed. Rep. of Germany ....... 3129364

[51] Int. Cl.[4] .......................... B42D 15/00; G06K 5/00
[52] U.S. Cl. ........................................ 283/82; 283/72; 235/380
[58] Field of Search ............... 283/82, 72, 85; 428/40, 428/202, 203; 235/380

[56] References Cited

U.S. PATENT DOCUMENTS

| | | | |
|---|---|---|---|
| 2,896,351 | 7/1959 | Johnson | 428/40 |
| 3,592,722 | 7/1971 | Morgan | 428/40 |
| 3,921,318 | 11/1975 | Calavetta | 283/82 |
| 4,092,526 | 5/1978 | Beck | 283/82 |
| 4,278,880 | 7/1981 | Buros | 283/82 |

FOREIGN PATENT DOCUMENTS

| | | | |
|---|---|---|---|
| 0024800 | 3/1981 | European Pat. Off. | 283/82 |
| 2829778 | 1/1980 | Fed. Rep. of Germany | 283/82 |
| 3005432 | 2/1980 | Fed. Rep. of Germany | 283/82 |
| 2330094 | 5/1977 | France | 283/904 |
| 1556241 | 11/1979 | United Kingdom | 283/82 |

*Primary Examiner*—Paul A. Bell
*Assistant Examiner*—Paul M. Heyrana, Sr.
*Attorney, Agent, or Firm*—Donald Brown

[57] ABSTRACT

A credit card (1) with a storage medium such as, for example, a magnetic strip (4) is provided. The credit card (1) is made multi-part and consists of a card body (2) and a strip (3) which can be applied thereto. The strip (3) can be replaced, as required, by new strips, making it possible to use the actual card body (2) several times. As a result, the costs of using the credit card are reduced substantially.

11 Claims, 2 Drawing Figures

U.S. Patent  Nov. 4, 1986  4,620,727

CREDIT CARD

This application is a continuation of application Ser. No. 479,067, filed Mar. 16, 1983 abandoned, July 16, 1985.

The invention relates to a credit card with a card body and with a storage medium for storing information to be recorded, and with a sensing region with a decodable surface pattern. Credit cards of this type are used as identity cards, check cards or the like.

German Offenlegungsschrift No. 2,829,778 discloses a credit card in which fluorescent material or magnetic material or electrically conductive material for identifying the credit card is provided, randomly distributed along a track in the card material. Because each card can be used only for a registered authorized amount, it is relatively expensive to produce the card.

The object of the invention is to provide a credit card which is improved in comparison with known credit cards and which can be produced especially simply and economically.

This object is achieved by means of a credit card of the type described in the introduction, wherein, according to the invention, the sensing region is designed as an element which can be applied to the actual card body or can be detached from it. This ensures that only one element of the card has to be exchanged when the credit card is to be used for a new authorized amount, whilst the actual credit card can be used again.

The actual credit card itself is preferably made of plastic or, for example, metal or solid elastic materials, whilst the element is made of a foil strip of paper or comprising metal or plastic material to be applied. Since the firmness of the credit card is achieved by means of the reusable plastic card, the credit strip can be produced simply and economically.

Figure 2:
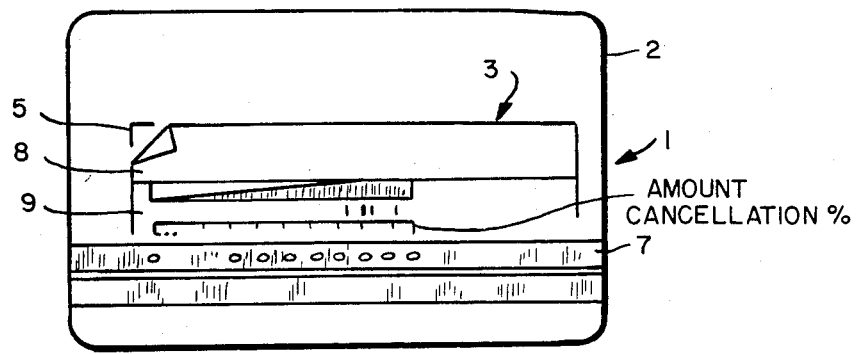

Further features and appropriate aspects of the invention emerge from the description of an exemplary embodiment with reference to the Figures in which:

FIG. 1 shows a plan view of a card body, and FIG. 2 shows a plan view of a credit card with a partially applied element.

The credit card 1 comprises the actual card body 2 and an element 3 connectable thereto. The card body 2 is a simple card made of a sufficiently firm material, preferably plastic material or a metal foil or a glass plate, with a storage medium in the form of a semiconductor chip or a magnetic strip 4. The card body itself does not need to have any measurable structure and, in particular, no electrically or magnetically reacting particles to form a structure identifying the card. If the complete credit card is to be evaluated by transmitted-light measurement, the plastic material is selected so that it is permeable to the radiation used, preferably infrared radiation. The magnetic strip 4 is of conventional design. On the card body, there is preferably a marking 5, 6 which indicates the point at which the element 3 is preferably to be applied to the card. If desired, a clock track 7 can also be provided.

According to the invention, the element 3 is designed as a simple paper strip, the rear side of which has an adhesive layer which allows it to be detached again from the plastic card body as completely as possible. If the credit card is to be used merely as an identity card or as an authorization card with an authorization frame which cannot be changed by individual transactions, such as, for example, a monthly season ticket for using public transport, a simple paper strip is sufficient as the element 3.

The card body 2, the element 3 and the credit card with the element 3 stuck on are each initially valueless and therefore do not have to be stored separately. To activate the credit card, the structure of the element 3, which arises, for example, from lines, strokes, a background pattern, surface pattern or the fiber structure of the paper or even from dielectric, magnetic or other structures which can be sensed, located in the paper, is sensed along a limited path or at certain points and is converted into identification data. At least some identification data selected from these and intended to be used for identifying the credit card are recorded on the magnetic strip 4. The procedure here is preferably that, during sensing along the path to be evaluated, the maximum value and the minimum value of the sensing result are determined, and that, for the evaluated path, the quotient of the maximum value and minimum value of the sensing result is then formed and a selected number of these quotients is recorded, as identification data, on the magnetic strip 4 of the credit card 1. In a subsequent identification operation, the credit card 1 is recognized as being genuine when a predetermined minimum number of quotients formed during the appropriate sensing of the element 3 corresponds to the appropriate identification data already recorded. At the end of the identification operation the newly determined identification data is recorded, when identity is affirmed, in the magnetic strip 4 instead of the previous identification data.

The paper strip forming the element 3 can be printed with information which represents visually the authorization emanating from the credit card. If the credit card is, for example, to authorize the owner to use a facility within a first month, he receives a paper strip, valueless on its own, with the month printed on it. After the paper strip has been stuck onto the card body 2, the credit card is activated in the above-described way by means of an appropriate station, with the structure of the paper strip being utilized, and in addition to the data identifying the card, the authorized amount, namely authorization for the first month, is recorded. By means of this credit card, the owner can exercise the authority during the first month. After the first month has expired, the credit card is rejected by the decoder stations, since the authorized amount is not sufficient for the second month. The user does not then have to discard the entire card, as is the case with conventional cards, but merely detaches the element 3 from the card body and, in its place, sticks a new paper strip in the place provided and on which, for example, authorization for the second month is printed. For example, on payment of an appropriate charge, the above-described operation of activating the card, and recording of the authority for the second month are entered, whereupon the card can also be used for the new period of time.

Should the credit card be used for an authorized amount which is reduced because individual transactions are carried out, for example money being taken from an account with a bank card, then in the way evident from FIG. 2, the element 3 can have, in addition to the actual track 8, for structure measurement, a region 9 in which the proportion of the partial expenditure of the original authorized amount, caused by carrying out individual transactions, can be displayed by means of a suitable marking device, for example by the setting of strokes 10, as indicated in FIG. 2. The region 9 can be made, for example, of a thermally active paper or a metal paper in which the metal surface is destroyed by an electrosensitive writing head.

In this embodiment also, the element 3 is first stuck onto the simple plastic card body 2 as a paper strip together with the track 8 for structure measurement and the cancellable region 9 which is completely valueless on its own. Activation and recording of the authorized amount then take place in the same way as in the first exemplary embodiment. As in corresponding credit cards made in one piece, authentication is effected at each use, as in the first exemplary embodiment. In addition, the particular new value is recorded, and this is obtained when the desired part amount is subtracted from the original amount. At the same time, the reduction in the amount is displayed in the region 9. When the amount has been used up, it is not necessary to discard the entire credit card. On the contrary, the element 3 is merely detached from the card body 2 and replaced by a new appropriate element, and activation and recording of an authorized amount can then be repeated in the way described above.

In the exemplary embodiments described above, the element 3 was always designed as a simple paper strip. This can also have a surface pattern or the like in the structure region 8 to be measured. If desired, however, the element 3 can also be made of another material, such as a metal or plastic foil, and in particular, in the region 8, to be measured, of the track for structure measurement, material can be distributed randomly and in the form of metal particles or the like, which material makes magnetic or electrical evaluation possible.

With the credit card 1 described, it is basically possible to apply all the methods which are also used in the case of credit cards made in one piece.

We claim:

1. A credit card with authenticity information and with information representing an authorized amount, the credit card being formed by a card body and a detachable element connectable thereto, wherein said element is made of a paper strip or foil applied to the card body so as to be detachable therefrom without the card body being damaged so as not to be reusable and wherein a storage medium and clock track is provided on said carb body, and the element comprises a cancellation track and randomly distributed particles which react to electrical or magnetic measurement for providing authenticity information.

2. The credit card as claimed in claim 1, wherein the element is a paper strip having an adhesive layer on one side.

3. The credit card according to claim 1 including at least one marking on the card which indicates the point at which an end of the strip is to be applied to the card.

4. The credit card according to claim 1 in which foil is of metal.

5. A credit card comprising a card body and an element which is detachably connectable to said card body and replaceable by a replacement element, said element and/or replacement element comprising data indicating an extent of authorization and a structure which can be sensed for providing identification information and said card body comprising a storage medium for storing authenticity information corresponding to at least parts of said identification information, said authenticity information being stored so that it is replaceable by new authenticity information.

6. A credit card comprising a card body and an element which is detachably connectable to said card body and replaceable by a replacement element, said element and/or replacement element comprising data indicating an extent of authorization and a structure which can be sensed for providing identification information and said card body comprising a clock track and a storage medium for storing authenticity information corresponding to at least parts of said identification information, said authenticity information being stored so that it is replaceable by new authenticity information.

7. The credit card as claimed in claim 6, wherein the element is a paper strip having an adhesive layer on one side.

8. The credit card as claimed in claim 6, wherein a cancellation track is provided on the element.

9. The credit card as claimed in claim 6, wherein the card body is made of plastic.

10. The credit card as claimed in claim 6, wherein the element has randomly distributed particles which react to electrical or magnetic measurement.

11. The credit card as claimed in claim 6 including at least one marking on the card which indicates the point at which an end of the strip is to be applied to the card.

* * * * *